July 11, 1939. G. STEVENSON 2,165,312
COMBINED SEAMING AND PINKING MACHINE
Filed May 14, 1937 10 Sheets-Sheet 4
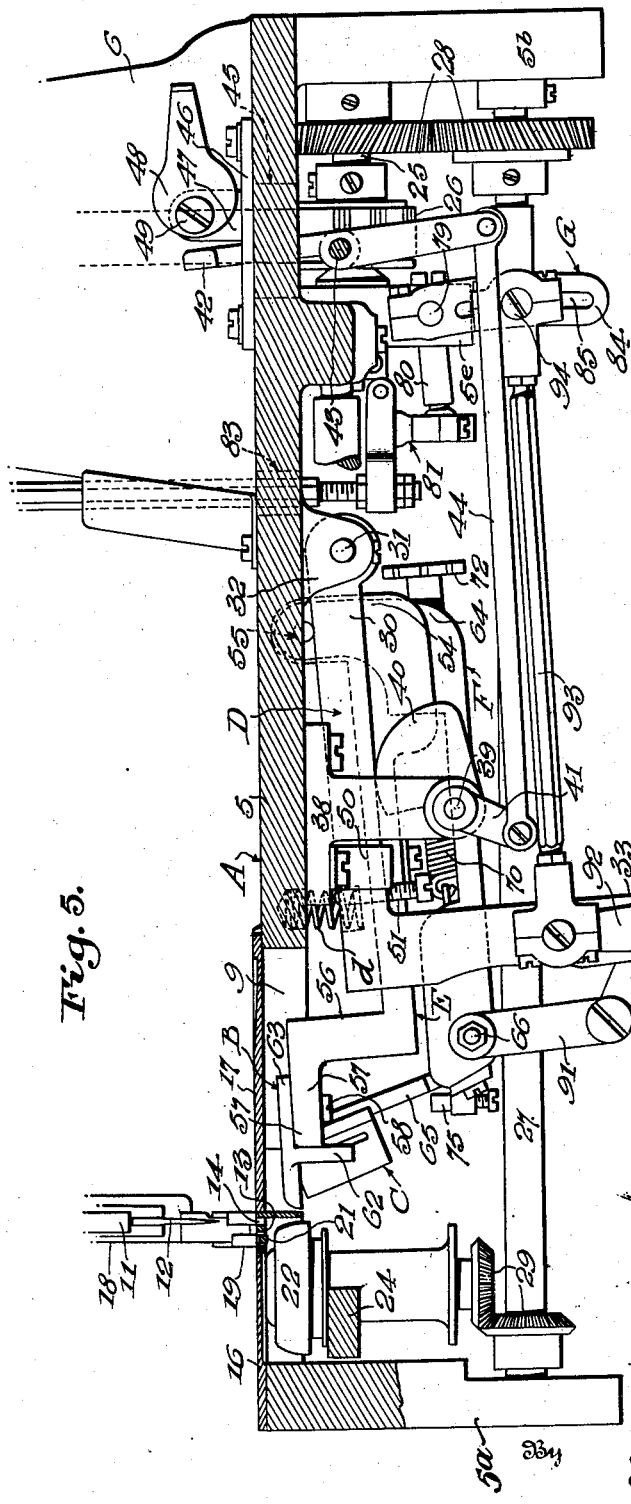
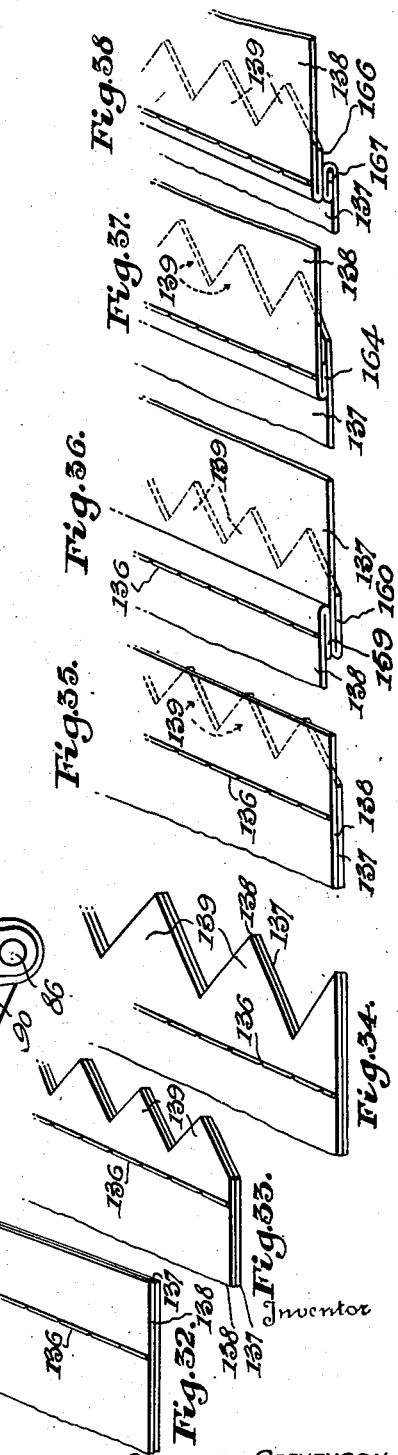
Inventor
GEOFFREY STEVENSON
By S. George Tate
Attorney

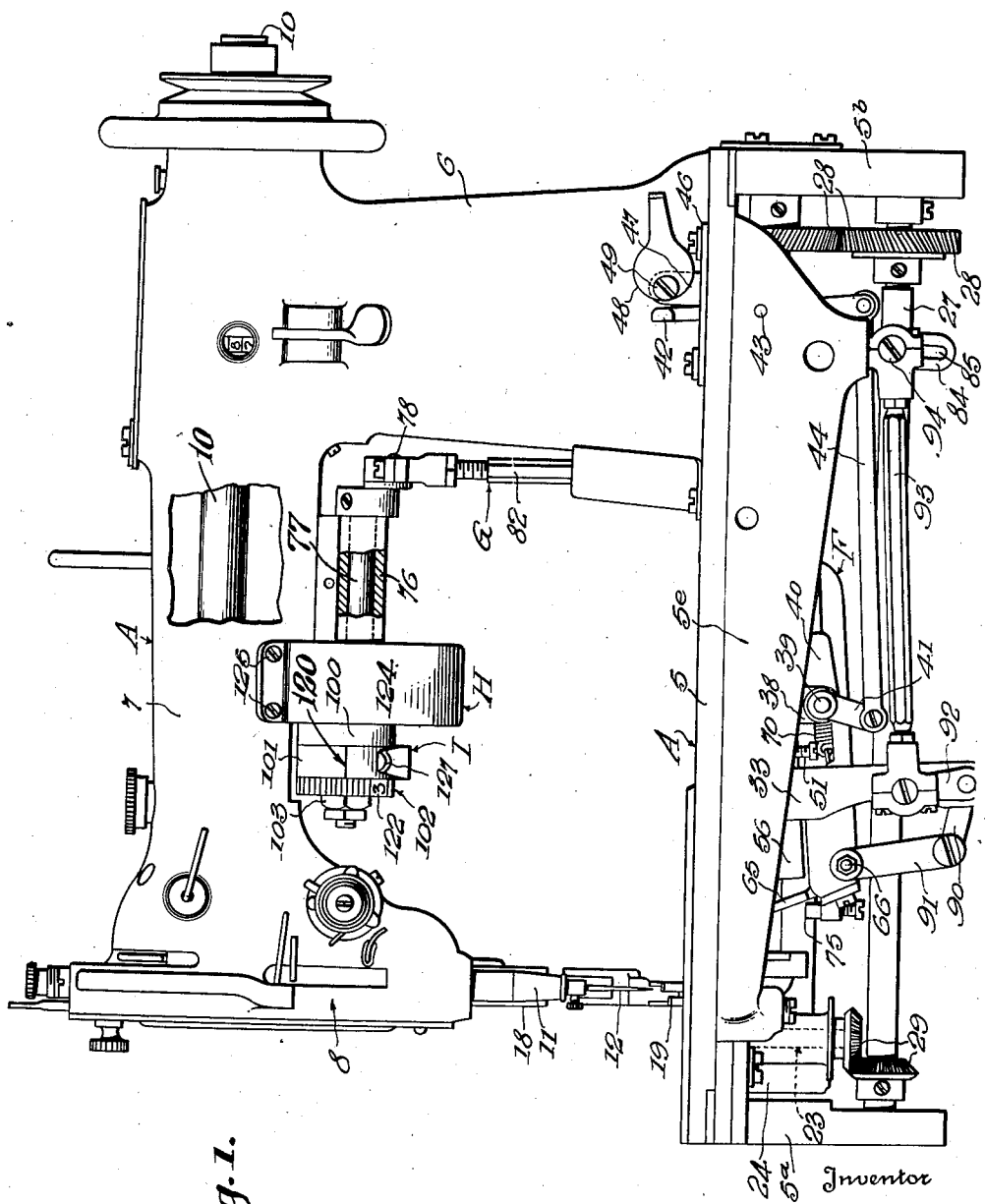

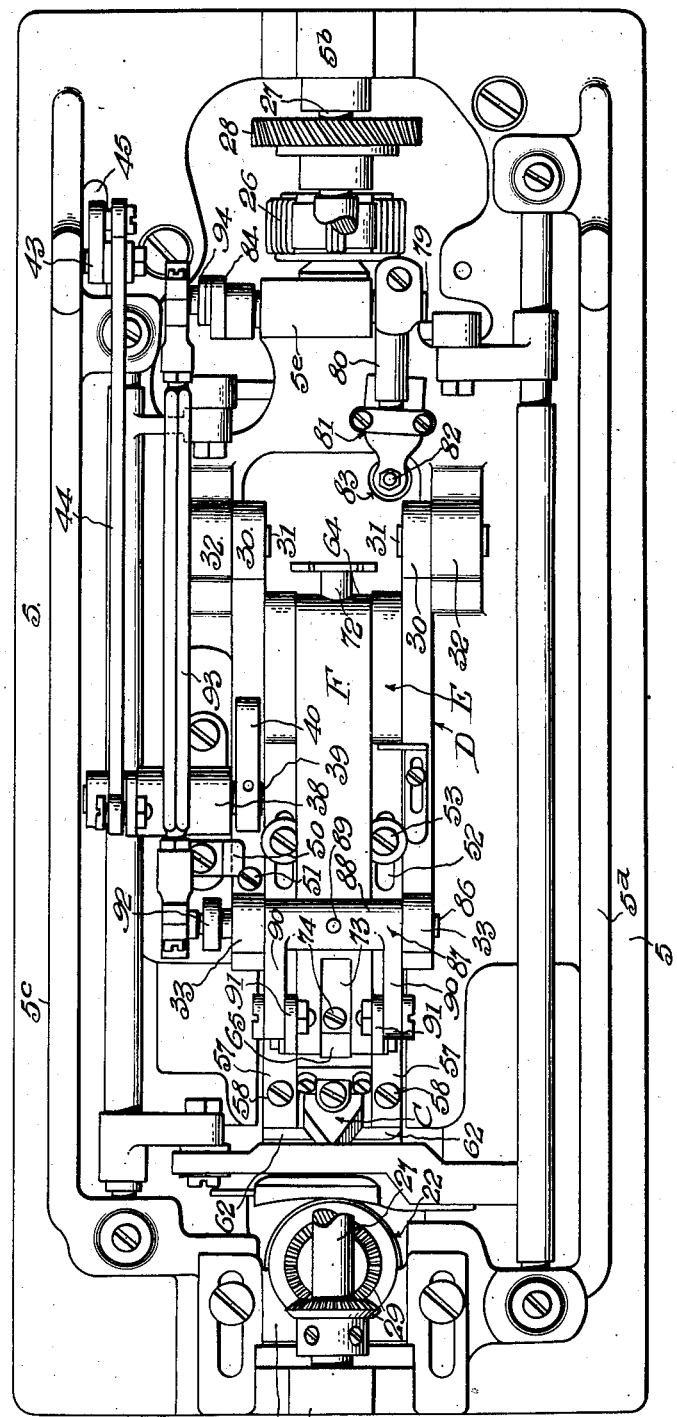

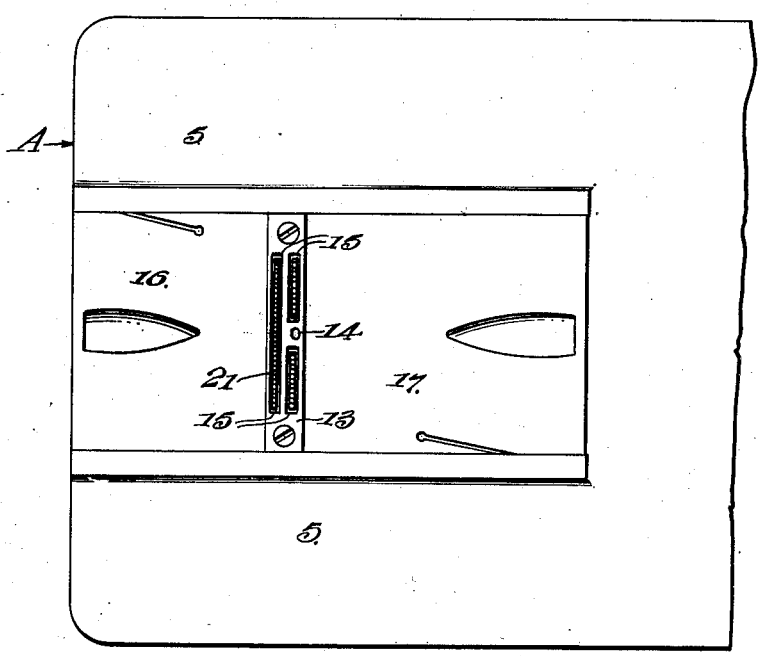

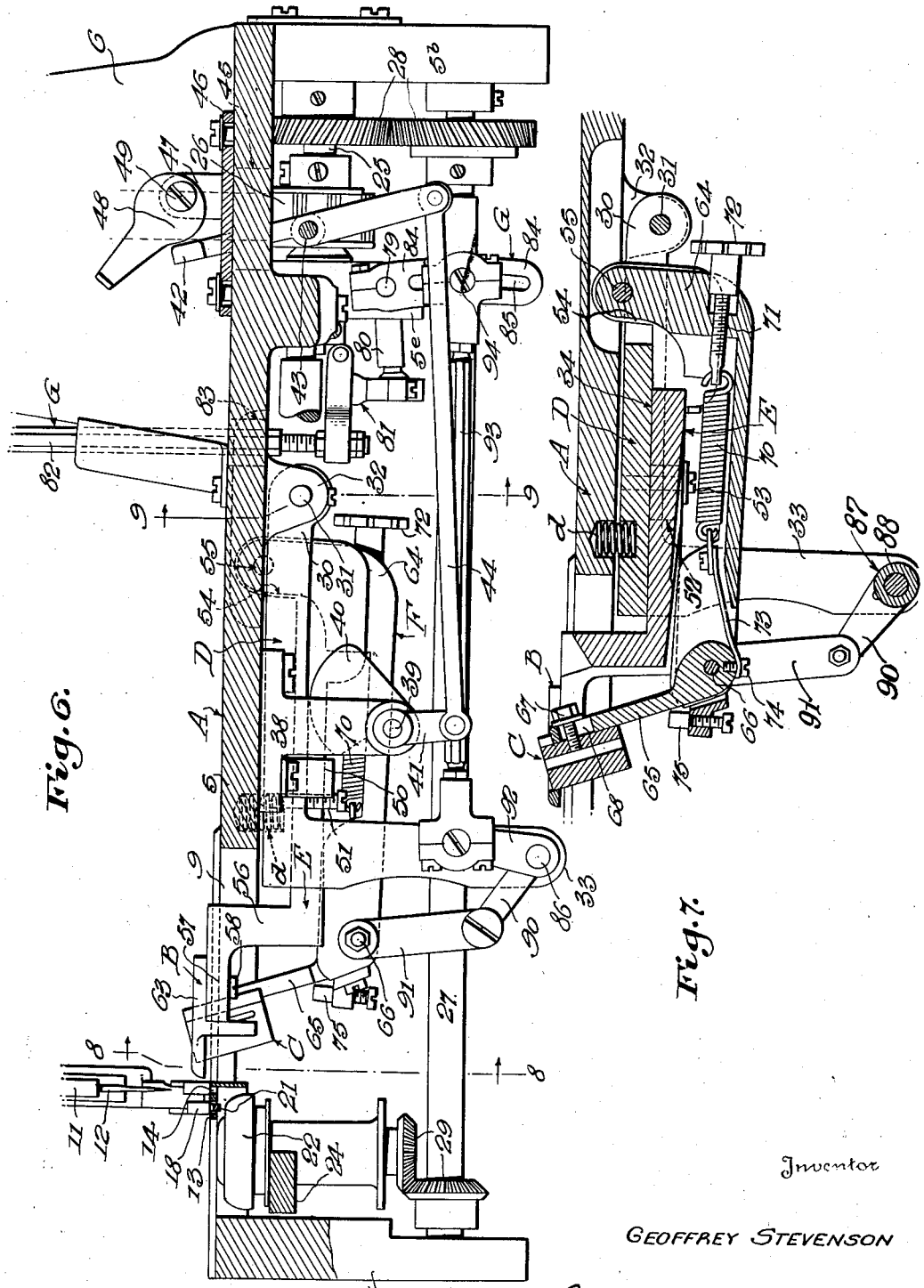

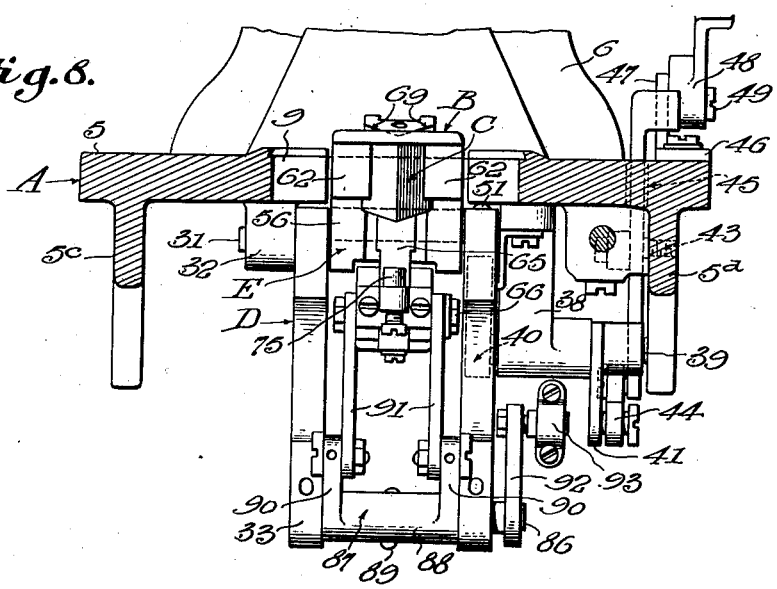

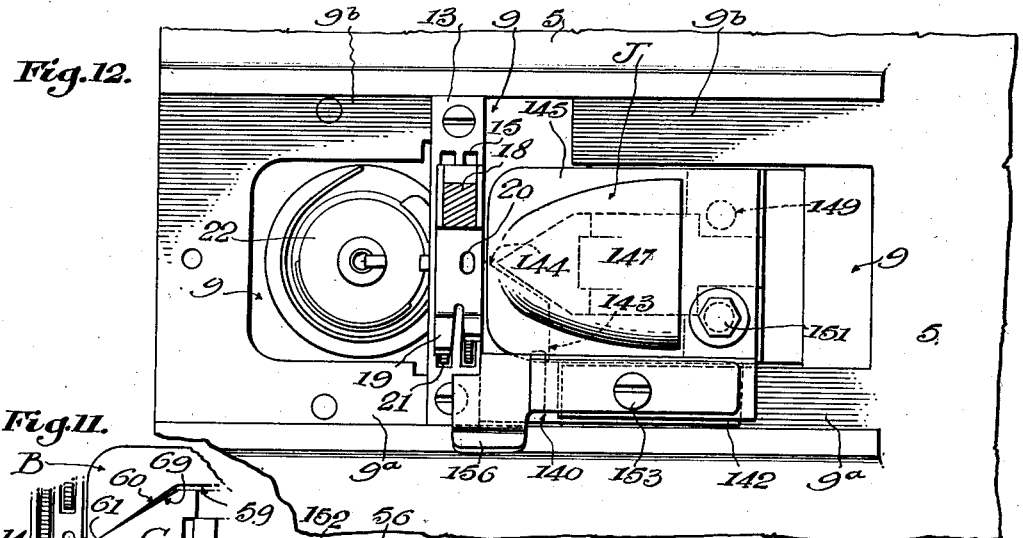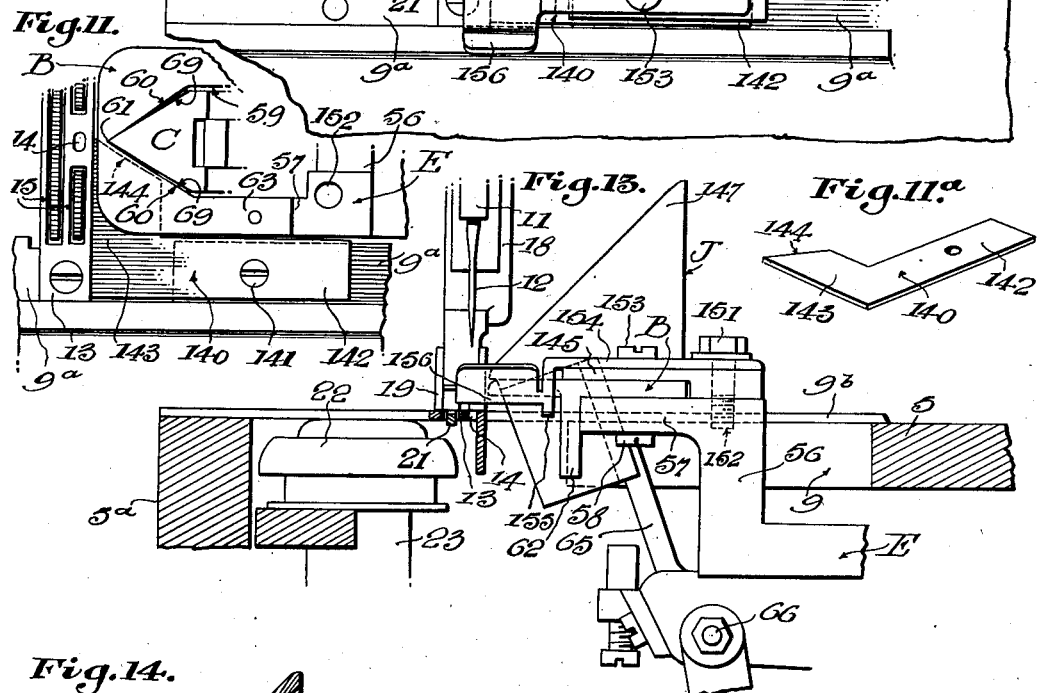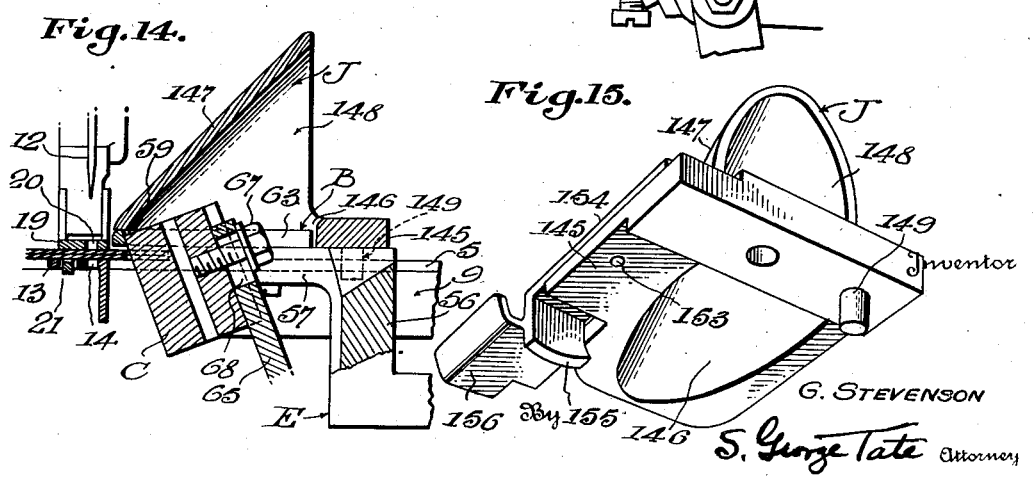

July 11, 1939.  G. STEVENSON  2,165,312
COMBINED SEAMING AND PINKING MACHINE
Filed May 14, 1937   10 Sheets-Sheet 8
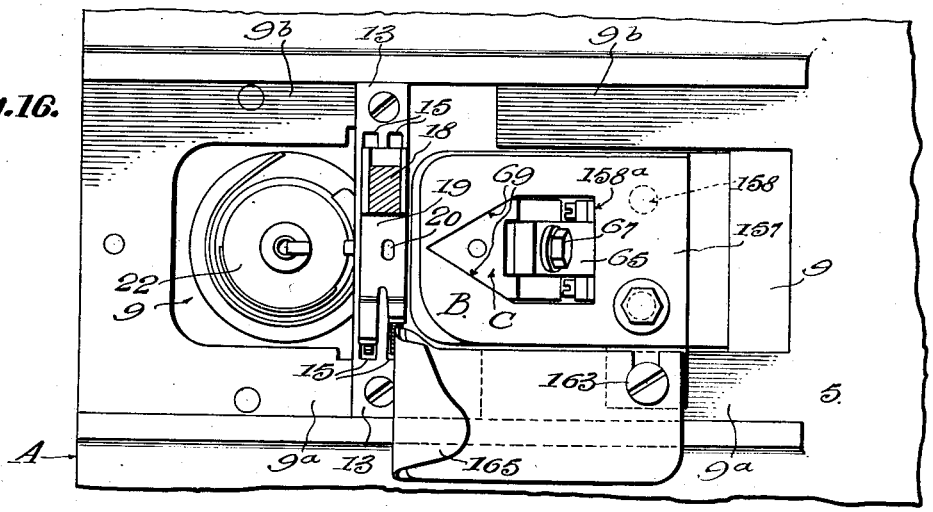
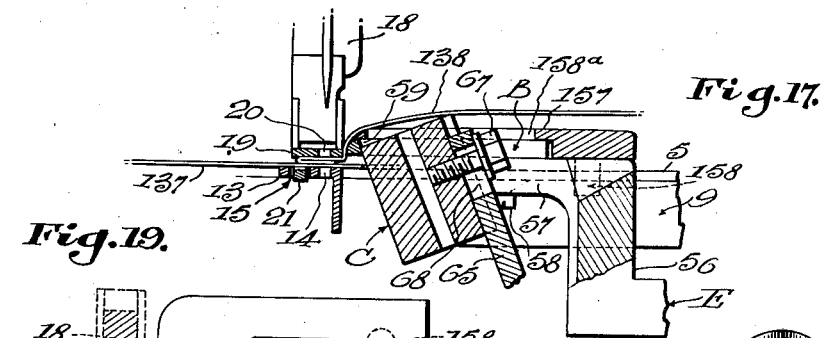
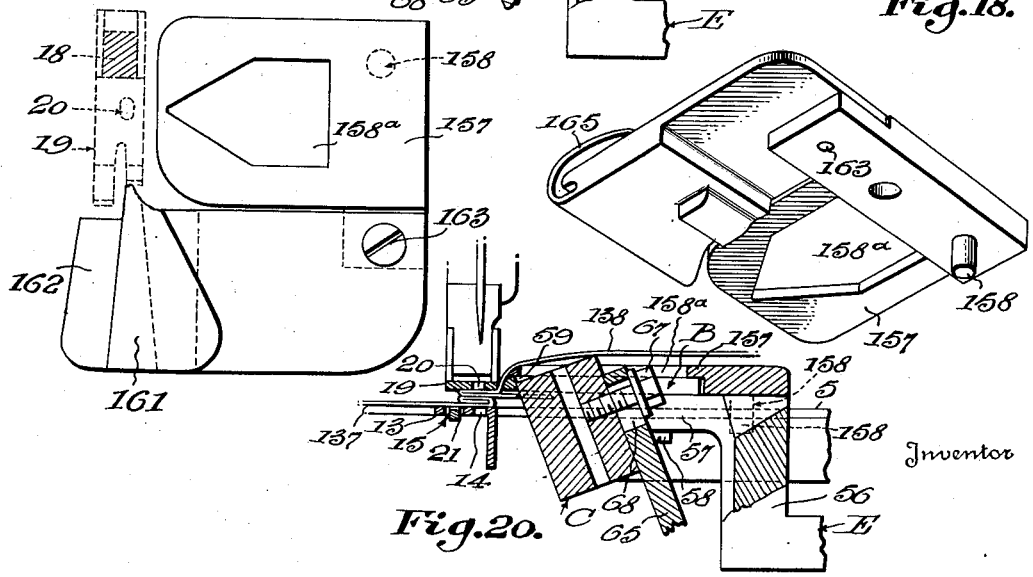
Inventor
GEOFFREY STEVENSON
By S. George Tate
Attorney July 11, 1939.　　　　G. STEVENSON　　　　2,165,312
COMBINED SEAMING AND PINKING MACHINE
Filed May 14, 1937　　　10 Sheets-Sheet 9
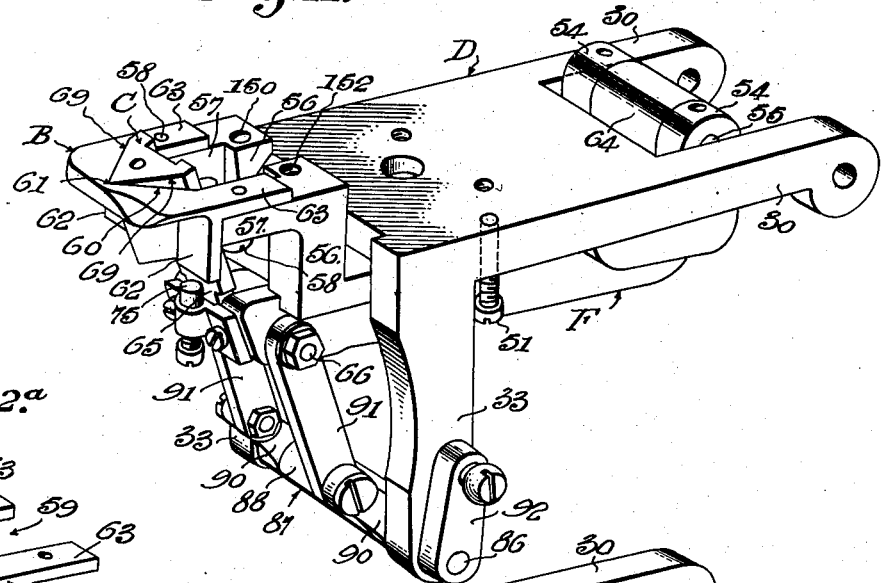
Fig. 21.
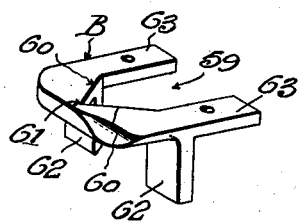
Fig. 22.ª
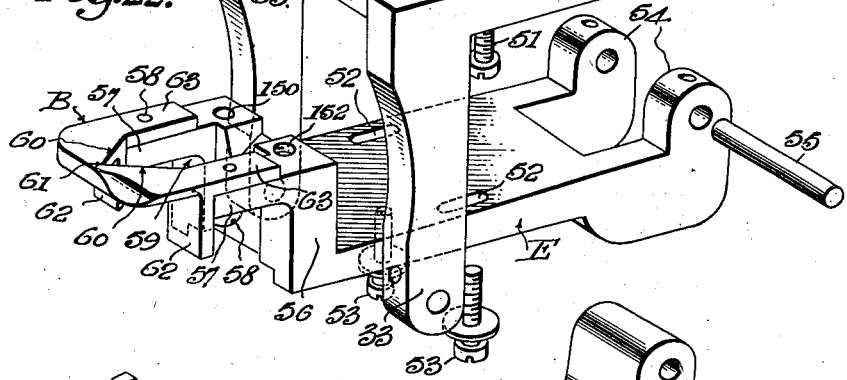
Fig. 22.
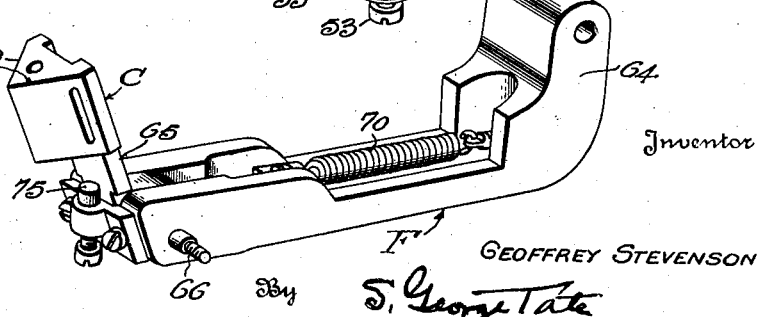
Fig. 23.
Inventor
GEOFFREY STEVENSON
By S. George Tate
Attorney July 11, 1939.  G. STEVENSON  2,165,312
COMBINED SEAMING AND PINKING MACHINE
Filed May 14, 1937  10 Sheets-Sheet 10
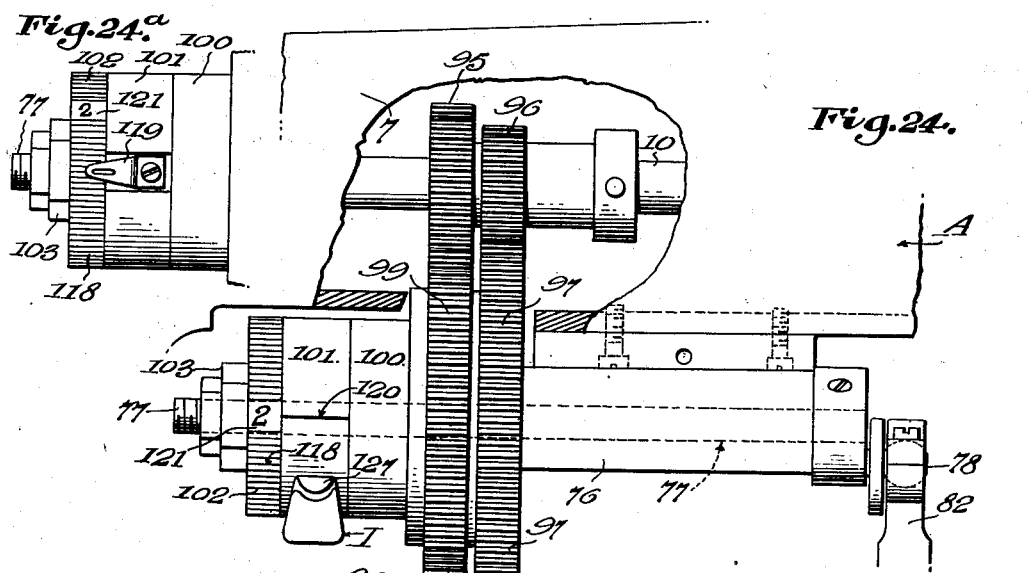
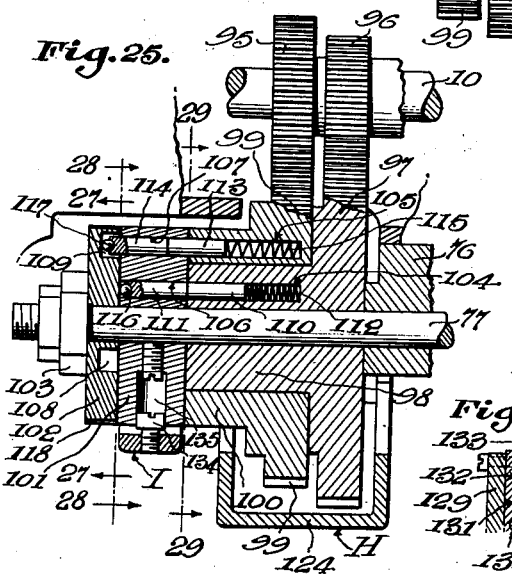
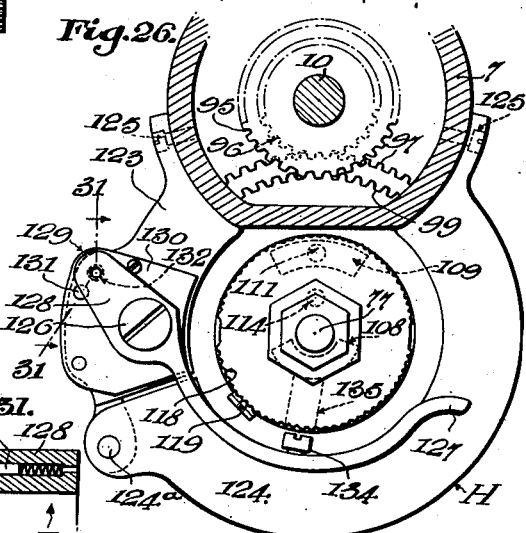
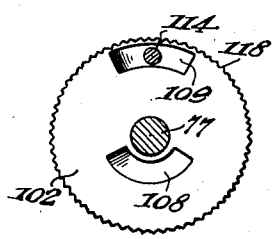
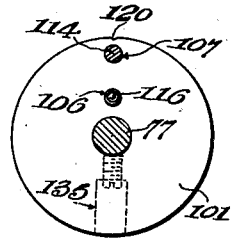
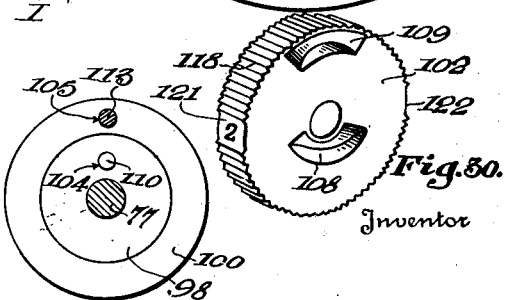
Inventor
GEOFFREY STEVENSON
By S. George Tate
Attorney Patented July 11, 1939

2,165,312

UNITED STATES PATENT OFFICE 2,165,312

COMBINED SEAMING AND PINKING MACHINE

Geoffrey Stevenson, Brookline, Mass.

Application May 14, 1937, Serial No. 142,696

67 Claims. (Cl. 112—122)

This invention relates to new and useful improvements in sewing machines generally, although more particularly to a combined seaming and pinking machine.

The trimming mechanism per se forms the subject matter of my divisional application Serial No. 170,913, filed October 25, 1937.

One of the principal objects of the invention is to provide an edge trimming mechanism which is normally positioned for cooperation with the stitching mechanism to trim the work above the base or work plate and in timed relation to the needle reciprocations, and which is depressible so as to leave the upper face of the base unobstructed for the free passage of work during plain seaming operations.

Another object of the invention is to provide a combined seaming and pinking machine which contains a selective mechanism for varying the ratio of pinks formed by the pinking mechanism to the number of stitches formed by the stitch forming mechanism.

Another object of the invention lies in the provision of such selective mechanism with means for silencing the pinking mechanism whenever so desired.

Another object of the invention is to provide a variable gear reduction unit in the driving connections between the main shaft of the machine and the reciprocatory pinking knife, which includes a manually operable means for selecting the desired gear reduction coupling of the unit, or for rendering ineffective the entire unit.

Another object of the invention is to provide a machine of the character described whereby both edges of layers of fabrics may be pinked, or whereby the edge of one layer only may be pinked, or whereby the fabrics may be seamed without pinking either fabric.

Another object of the invention is to provide a chip deflector for preventing the chips from fouling the needle and from being deposited on the pinked fabric.

A further object of the invention resides in providing a separating plate over which a body fabric may be fed without trimming or pinking the same, and which also cooperates with the ledger blade to assist the latter in resisting the upward pressure of the reciprocatory knife during the cutting stroke of the latter.

A still further object of the invention is to provide knife driving means which includes means for adjusting the stroke of the knife.

With these and other objects in view which will more fully appear, the nature of the invention will be more clearly understood by following the description, the appended claims, and the several views illustrated in the accompanying drawings.

In the drawings:

Figure 1 is a front elevation of a sewing machine embodying my invention, the pinking unit being depressed below the bed plate, Figure 2 is a bottom plan view thereof, Figure 3 is a top plan view of the bed plate as shown in Figure 1, the view showing the presser foot and throat plate, and also showing the cover plates in closed positions, Figure 4 is a similar view, but showing the cover plates removed, Figure 5 is an enlarged vertical longitudinal sectional view through the bed plate showing the pinking unit in its depressed position, Figure 6 is a similar view but showing the pinking unit in its elevated or working position, Figure 7 is a vertical longitudinal section taken through the bed plate and the pinking unit, Figure 8 is a vertical cross section taken on the line 8—8 of Figure 6, Figure 9 is a vertical cross section taken on the line 9—9 of Figure 6, Figure 10 is a detail vertical cross section showing the stops for limiting the upper and lower positions of the pinking unit, Figure 11 is a detail plan view showing the pinking unit in its elevated position, together with a plate which covers the opening immediately in front of the unit, Figure 11$^a$ is a perspective view of the filler plate shown in Figure 11, Figure 12 is a top plan view showing the pinking unit in its elevated or working position, together with a chip guard for preventing the chips from fouling the needle and for permitting said chips to gravitate through a space at the right of the reciprocatory knife to a point below the bed plate, Figure 13 is a vertical longitudinal section taken through the bed plate but showing the pinking unit together with the chip guard in front elevation, Figure 14 is a detail vertical section taken through the pinking unit and chip guard, Figure 15 is a perspective view of the chip guard, Figure 16 is a plan view similar to Figure 12 but showing a separating plate and a hemmer substituted for the chip guard, Figure 17 is a central vertical longitudinal section thereof, Figure 18 is a perspective view of the separating plate and hemmer, Figure 19 is a plan view of a separating plate having superposed hemmers attached thereto, Figure 20 is a central vertical longitudinal section showing the relation between the pinking unit and the combined separating plate and hemmer shown in Figure 19, Figure 21 is a perspective view of the pinking unit, Figure 22 is a perspective view showing the supporting lever and the ledger blade holder in separated relation, Figure 22a is a perspective view of the upper cutting element, Figure 23 is a perspective view of the knife lever and the knife mounted thereon, Figure 24 is an enlarged front elevation of the control mechanism for the pinking unit, Figure 24a is a detail elevation of the manually operable control element, Figure 25 is a vertical longitudinal section thereof, Figure 26 is a left end elevation of the control mechanism, the sewing machine arm and main shaft being shown in section, and the clutch collar locking lever being shown in its inoperative position, Figure 27 is a detail section taken on the line 27—27 of Figure 25, Figure 28 is a detail section taken on the line 28—28 of Figure 25, Figure 29 is a detail section taken on the line 29—29 of Figure 25, Figure 30 is a perspective view of the manually operable control element, Figure 31 is a detail section taken on the line 31—31 of Figure 26, and Figures 32 to 38 are perspective views showing various seams which can be formed by my invention.

Referring to the drawings, my invention includes a sewing machine which embodies a main frame A having a base or bed plate 5, a standard 6, a horizontal arm 7 which projects from the upper end of the standard and extends longitudinally over the base, and a stitching head 8 which is mounted on the free end of the arm 7, said base being provided with a longitudinal opening 9 under said head. The base 5 is provided at its ends with integral and depending bearing arms 5a, 5b, and with integral and depending front and rear longitudinally extending walls 5c, 5d, as well as an integral and depending bearing arm 5e which is spaced from the bearing arm 5b. The upper surface of the base 5 is milled along the sides of the opening 9 to form resultant front and rear depressed seats 9a, 9b. A main shaft 10 extends longitudinally of and is journaled in the arm 7. A vertically reciprocatory needle bar 11 carrying a needle 12, is mounted in the head 8 and is driven from the main shaft by the usual connections which reciprocate the needle once for every rotation of the main shaft. A throat plate 13 which is supported by the seats 9a, 9b of the base and extends centrally across the opening 9, is provided with a needle opening 14 adjacent the right hand edge thereof and with feed slots 15. The portions of the opening 9 on opposite sides of the throat plate are adapted to be closed by removable cover plates 16 and 17 respectively which are slidably mounted on the seats 9a, 9b. A presser bar 18 is mounted in the head 8 and fixed to the lower end thereof is a presser foot 19 which is positioned directly above the throat plate 13 and is provided with a needle opening 20. An intermittent 4-motion feed dog 21 is positioned in the feed slots 15 of the throat plate for cooperation with the presser foot to feed the work rearwardly and is operated from the main shaft in the usual manner. Cooperating with the needle to form stitches is a rotary loop taker or hook 22 which is located below the cover plate 16 and on the left hand side of the needle. This hook is mounted on a vertical shaft 23 which is journaled in a bracket 24 attached to the base. A horizontal shaft 25 is journaled in the bearing arms 5b and 5e below the base 5 and the standard 6 and is driven at a 2-to-1 ratio from the main shaft 10 by a belt 26. The vertical shaft 23 is driven from the shaft 25 through the medium of a horizontal shaft 27 which is journaled in the depending bearing arms 5a, 5b, and 1-to-1 gear couplings 28 and 29, the shaft 27 being located below the needle and in spaced relation to the base. It will be noted that the shaft 27 extends longitudinally of the base and is disposed in the vertical plane containing the needle.

A trimming mechanism is disposed on the right hand side of the needle, i. e., on the side of the needle opposite the rotary loop taker. This trimming mechanism includes an upper cutting element or ledger blade B and a cooperating lower cutting element or knife C. The upper element B is separate from the presser foot 19, and when said element is in its effective or cutting position, it is disposed above the plane of the base 5. Both cutting elements B and C are mounted on a support D which is located below the base, the elements and the support being adjustable longitudinally of the base as a unit whereby the distance between the line of seam of the fabrics and the trimmed edge thereof may be varied. Furthermore, both elements are movable upwardly as a unit through the opening 9 of the base to an effective or operating position, or downwardly as a unit through said opening to an ineffective or inoperative position below the base 5.

The support D is in the form of a lever having spaced longitudinal arms 30, 30 which extend from its right hand end and are fulcrumed as at 31, 31 on lugs 32, 32 projecting downwardly from the base, the lever thus being fulcrumed on a horizontal axis which is parallel to the line of feed and is located below the base opening 9 and the standard 6. Rigidly connected to and depending from the free end of the supporting lever D are spaced hanger arms 33, 33 and the under face of the supporting lever is provided with a central longitudinal groove 34.

A coil spring d is interposed between the base 5 and the supporting lever and functions to urge the lever downwardly, the upper and lower ends of the spring being positioned in seats respectively formed in the under face of the base and in the upper face of the lever.

A manually operable means for elevating the support D includes a bracket 38 which is attached to the under face of the base 5 in front of and intermediate the ends of the support. A horizontal cam shaft 39 is journaled in the bracket and fixed to said shaft is a cam 40 which engages the under face of the supporting lever D directly in front of the groove 34 therein. The cam shaft 39 is provided with a depending crank arm 41. A vertically disposed lever 42 is fulcrumed intermediate its ends as at 43 to the front wall 5c of the base 5. The lower arm of this lever is connected by a link 44 to the crank arm 41, and the upper arm of said lever projects through a longitudinally extending opening 45 formed in the base 5. A bracket 46 is mounted on the upper face of the base 5 and includes a post 47 which is disposed on the right hand side of the upper arm of said lever. A manually operable eccentric 48 is fulcrumed as at 49 on said post for engaging the upper arm of the lever and effecting the rocking movement of the cam to raise the support D against the tension of the spring d. A stop 50 is attached to the bracket 38 and functions to limit the downward movement of the support D when the cam 40 is moved in the opposite direction. A stop screw 51 is threadably engaged in the support D for cooperation with the under face of the base 5 to variably limit the upward movement of said support.

Mounted in the groove 34 of the supporting lever D for adjustments towards and from the needle 12, is a holder E for the upper cutting element B, the holder being provided with longitudinal slots 52, 52 through which clamping screws 53 pass into the lever D. The holder E is thus normally clamped to and supported by the lever D and is consequently movable up and down therewith, but can be adjusted longitudinally of the base when so desired. The right hand end of the holder is provided with spaced and upwardly projecting arms 54, 54 which project between the arms 30, 30 of the supporting lever D and support a horizontal pivot pin 55. Rigidly connected to the left hand end of the holder and disposed in registry with the base opening 9 at the right of the throat plate is a neck 56 which terminates at its upper end in spaced horizontal arms 57, 57 which project towards the needle, and the upper cutting element or ledger blade B is rigidly mounted on said arms by screws 58, 58.

The upper cutting element or ledger blade B is provided with a V-shaped opening 59 forming resultant cutting edges 60, 60 which converge toward the needle 12 and merge at the apex 61 at an angle of less than 90°; and with depending guide lugs 62, 62 to prevent the escape of the lower cutting element or knife C from registering relation with the ledger blade in the most open working position of the knife, as well as to serve as a gage for the material. The blade B is also provided with spaced attaching arms 63, 63 which rest upon the spaced supporting arms 57, 57 and are secured thereto by the screws 58.

A lever F which supports the lower cutting element or knife C is mounted for vertical reciprocations on the support D through the medium of the holder E. This knife lever F is located under the holder E and is provided at the end opposite the knife C with an upwardly projecting rigid arm 64 which is fulcrumed on the horizontal pivot pin 55 of the ledger blade holder E. A knife arm 65 is pivoted at its lower end to swing about a horizontal pivot 66 mounted in the free end of the lever F, and the upper end of the arm projects upwardly towards the opening of the ledger blade B. The knife C is mounted on the arm 65 for vertical adjustments by means of a clamping screw 67 carried by the knife and a slot 68 formed in the arm. The knife C is V-shaped in cross section forming converging cutting edges 69, 69 which enter into and cooperate with the cutting edges 60, 60 of the ledger blade to perform the pinking operation. The knife C is presented at an inclination to the ledger blade and the plane of the cutting edges 69, 69 is oblique to the longitudinal axis of the knife so that the rear corners of the knife are in advance of the apex during the cutting operation, with the result that the two pairs of cooperating cutting edges have point contact which advances toward the apex as the cutting progresses by the entry of the knife C into the ledger blade B, the cutting terminating when the two apices coincide. The knife C yields about the pivot 66 during the cutting operation, the edges 69, 69 crossing the cooperating edges of the ledger blade but the angle of the faces of the knife C being less in the plane of the ledger blade than that of the ledger blade opening whereby the knife C may enter into the ledger blade. This angular relation between the cutting edges of the ledger blade and the cutting edges of the knife is disclosed and claimed in the patent to Gruman 1,891,308, December 20, 1932. The cutting edges of the knife are maintained in yieldable engagement with the cutting edges of the ledger blade during cutting movements of the knife, by means of a coil spring 70 which is adjustably anchored at one end to the arm 64 of the knife lever F by an adjustable screw 71 and nut 72, and by a link 73 which is connected at one end to the other end of the spring, and at its other end to the lower end of the knife arm 65 below the pivot 66 thereof by a screw 74. A manually operable cam 75 is mounted on the lever F for cooperation with the knife arm 65 to positively retract and retain the knife C from contact with the ledger blade B whenever it is desired to change the knife.

The knife C is adapted to be reciprocated from the main shaft 10 in timed relation to the needle reciprocations by a driving mechanism G which includes a manually selective means for effecting the formation of either a greater or a lesser number of stitches to each pink cut by the knife C, or for silencing the knife. A bearing bracket 76 is attached to the under face of the horizontal frame arm 7, and journaled in this bracket is a longitudinally extending counter or driven shaft 77 which parallels the main shaft 10, the left hand end of the shaft projecting beyond the bracket 76. A ball eccentric 78 is fixed to a stop collar which is secured to the right hand end of the counter shaft 77. A transversely disposed rock shaft 79 is journaled in the depending bearing arm 5ᵉ of the base, and the rear end thereof is provided with a horizontally extending rock arm 80 which is pivotally connected as at 81 to the lower end of a vertical link or pitman 82 which extends upwardly through an opening 83 in the base and has its upper end connected to the ball eccentric 78 on the counter shaft. Fixed to the front end of the rock shaft 79 is a depending rock arm 84 having a segmental slot 85 extending longitudinally thereof. A horizontal rock shaft 86 is journaled in the lower ends of the depending arms 33, 33 of the supporting lever D, and a rocking frame 87 is journaled on said shaft intermediate said arms. The rocking frame 87 comprises a hub 88 which surrounds the shaft and is rigidly connected thereto by a transverse pin 89, together with spaced rock arms 90, 90 which are integral with the hub and project upwardly at an inclination towards the free end of the knife supporting lever F, the arms being pivotally connected to said free end of the lever F by links 91, 91. Fixed to the front end of the rock shaft 86 is an upstanding rock arm 92 which is pivotally connected to one end of a link 93, the other end of the link having an adjustable connection 94 with the rock arm 84 and the segmental slot 85 therein, whereby the vertical stroke of the knife C may be varied.

Relatively large and small driving gears 95, 96 are fixed to the main shaft 10. A relatively large driven gear 97 is loosely journaled on the projecting end of the counter shaft 77 and is in constant mesh with the driving gear 96. The driven gear 97 is provided with a hub 98 on which is loosely journaled a relatively small driven gear 99 which is in constant mesh with the driving gear 95, the gear 99 being provided with a hub 100 which surrounds the hub 98. The outer ends of the hubs 98, 100 terminate in the same transverse plane, and a clutch collar 101 is fixed on the counter shaft 77 and is positioned directly against the outer ends of said hubs.

The ratio of the gear coupling 96, 97 is three-to-one, and the ratio of the gear coupling 95, 99 is two-to-one, although it will be understood that different ratios may be employed if desired. It will be apparent that as thus far described both gear couplings are free to rotate without either one imparting rotation to the counter shaft 77. Selective clutch connections (Figs. 25 to 30) are provided between the clutch collar 101 and the hubs 98, 100 of the driven gears 97, 99 whereby either gear may rotate the counter shaft 77 and thereby reciprocate the knife C, or whereby both driven gears may be disconnected from the clutch collar to effect the silencing of said knife. To this end, a manually operative control collar 102 is journaled on the outer end of the counter shaft and has sliding contact with the outer face of the clutch collar 101 and is held against outward longitudinal movement by a nut 103 mounted on said counter shaft. The hubs 98, 100 are respectively provided with longitudinal bores 104, 105 which extend inwardly from the outer ends of the hubs and are positioned eccentrically with respect to the counter shaft 77, the bore 104 having a shorter radius than the bore 105. The clutch collar 101 is provided with longitudinal openings 106, 107 which are located eccentrically with respect to the counter shaft 77 and in a common radial plane, the openings being adapted to aline with the counter bores 104, 105 respectively. Formed in the inner face of the operating control collar 102 are concentric cam grooves 108, 109, which are arranged on opposite sides of the counter shaft 77, the grooves having different radii whereby the grooves may alternately register with the openings 106, 107 of the clutch collar 101, the grooves preferably having lengths of less than 90°. Slidably mounted in the bore 104 and opening 106 are clutch pins 110, 111 which are urged outwardly towards the control collar 102 by a spring 112 seated in said bore. Slidably mounted in the bore 105 and opening 107 are clutch pins 113, 114 which are urged outwardly towards the control collar 102 by a spring 115 seated in said bore. The outer ends of the pins 111, 114 are preferably provided with antifriction balls 116, 117. The periphery of the control collar 102 is knurled as indicated at 118, and a spring finger 119 is attached to the periphery of the clutch collar 101 for cooperation with said knurled periphery to retain the control collar in any position of adjustment.

Formed on the periphery of the clutch collar 101 is a longitudinally extending indicating line 120, and formed on the periphery of the control collar 102 at diametrically opposite points and intermediate the cam grooves 108, 109 are identifying indicia 121, 122 for the clutch grooves 108, 109, said indicia preferably consisting of the numerals 2 and 3, the former being associated with the groove 109 which controls the clutch for the two-to-one gear coupling 95, 99, and the latter being associated with the groove 108 which controls the clutch for the three-to-one gear coupling 96, 97.

It will be apparent that in one position of angular adjustment of the control collar 101, the cam groove 109 will register with the clutch pin opening 107, but that the cam groove 108 will not register with the clutch pin opening 106, and vice versa, and that in another position of angular adjustment of the control collar both cam grooves will be out of register with said clutch pin openings.

It will be apparent that when the control collar 102 is rotated to aline the number 2 thereon with the indicating line 120 on the clutch collar 101, the clutch pins 113, 114 will be projected outwardly by the spring 115, the outer end of the pin 114 will be moved into the cam groove 109, and the pin 113 will be projected across the abutting faces of the hub 98 and the clutch collar 101 whereby the two-to-one gear coupling 95, 99 will be clutched to the counter shaft 77 to reciprocate the knife C once during the formation of every two consecutive stitches.

It will be also apparent that when the control collar 102 is rotated 180°, the number 3 will be alined with the indicating line 120 on the clutch collar 101, the clutch pins 110, 111 will be projected outwardly by the spring 112, the outer end of the pin 111 will be moved into the cam groove 108, and the pin 110 will be projected across the abutting faces of the hub 98 and the clutch collar 101 whereby the three-to-one gear coupling 96, 97 will be clutched to the counter shaft 77, to reciprocate the knife C once during the formation of every three consecutive stitches.

It will be further apparent that when the control collar 102 is rotated to a position wherein both cam grooves are out of register with the clutch pins, the abutting ends of the pins 110, 111, and 113, 114 will register with the abutting faces of the hubs 98, 100 and the clutch collar 102, whereby both gear units will be unclutched from the counter shaft 77, with the result that the counter shaft will remain stationary and the knife C will be silenced.

A 2-part casing H is mounted on the frame arm 7 for covering the two gear units 96, 97 and 95, 99. This casing includes a stationary part 123 and a swingable part 124 which is hinged as at 124ª to the former, both parts, however, being removably attached to the arm 7 by screws 125, 125.

A locking lever I for the clutch collar 101 extends partially around and under said collar and is fulcrumed intermediate its ends as at 126 to the stationary part 123 of said gear casing, the front end of the lever being bent forwardly as at 127 to form a fingerpiece, and the rear end of lever beyond the fulcrum 126 forming a lever arm 128. Attached to an ear 129 which extends rearwardly from the stationary part 123 of the gear casing is a plate 130 having spaced recesses 131 and 132 formed in its outer face. A spring-pressed pin 133 is mounted in the arm 128 of the locking lever I for cooperation with either of the recesses 131, 132 to retain said lever in either one of its extreme positions. Fixed to the lever I and projecting inwardly therefrom is a stop pin 134 which upon upward movement of the lever I is adapted to be positioned in a radial recess 135 formed in the clutch collar 101 and thereby lock said collar against rotation. Thus when the locking lever I is elevated to lock the clutch collar against rotation the spring pin 133 will become seated in the recess 131 and thereby retain said lever in said operative position. When, however, the lever is moved downwardly so as to release the pin 134 from the clutch collar 101, the pin 133 will engage in the recess 132 and retain said lever in its other extreme or inoperative position.

In operation, when it is desired to employ the machine for a combined seaming and pinking operation, the cover plate 17 is retracted or removed, and the cutting elements B, C, are then elevated from the position shown in Fig. 5 to the position shown in Fig. 6. The selected gear coupling is then clutched to the counter shaft by first manually rotating the main shaft and swinging the lever I upwardly to its operative position which locks the clutch collar against rotation. The control collar 102 is then manually rotated until the number 2 or number 3 thereon is brought into register with the indicating line 120 on the clutch collar 101, at which time the associated clutch pin 110 or 113 will then become effective to clutch the associated gear coupling with the counter shaft. The lever I is then swung downwardly to its inoperative poistion, and the machine is then ready to seam and pink as shown in Fig. 33 or 34, by forming a line of stitches 136 along the edge portions of superposed fabrics 137, 138, and simultaneously cutting pinks 139 in said edge portions. In Fig. 33 there are shown two stitches to each pink whereas in Fig. 34 there are shown three stitches to each pink.

When it is desired to employ the machine for seaming purposes only, the manually operable eccentric 48 will be swung to the right, then the lever 42 will be swung to the right which will rock the cam 40 to the right to permit the spring d to depress the holder D together with the cutting elements B, C to their ineffective or inoperative position as shown in Fig. 5. The knife C is silenced by swinging the lever I upwardly to its operative position and then rotating the control collar 102 until the cam grooves 108, 109 are out of register with the clutch pins 111, 114, and the cover plate 17 is returned to its normal position. The lever I is of course retained in its operative position in order to permit the driven gears 97, 99 to revolve freely without rotating the counter shaft. The silencing of the knife can be performed either before or subsequent to the depression of the cutting elements. The machine is then ready to seam without pinking, as shown in Fig. 32.

When the upper cutting element or ledger blade B is in its elevated or operative position as shown in Fig. 6, it is in a horizontal plane spaced above the upper surface of the base 5 for permitting both edge portions of superposed fabrics or the edge portion of the lower fabric to be fed thereunder and pinked. In order to support this edge portion or portions against sagging into the opening 9 of the base 5 immediately in front of the lower cutting element C, I have provided an L-shaped filler plate 140 (Figs. 11, 11a, 12) which is attached, subsequent to the cutting elements being elevated, to the front seat 9a of the base 5 by a screw 141. This plate 140 comprises an attaching arm 142 and a rearwardly projecting arm 143 having a beveled rear end 144 which parallels but is spaced from the adjacent cutting edge 69 of the knife C.

In order to avoid the chips from fouling the needle when pinking the edge portions of superposed fabrics, I have provided a chip deflector J (Figs. 12 to 15) which causes the chips to pass downwardly through the heel portion of the ledger blade opening 59, that is, between the attaching arms 63, 63 of said blade and on the right of the knife C as viewed in Fig. 14. This deflector J comprises a base plate 145 having an opening 146 which surrounds the ledger blade opening 59, and a semi-conical deflector wall 147 mounted on the base, the deflector projecting upwardly from the base at a point intermediate the knife C and the needle 12 and terminating at its right hand end in a vertically disposed opening or mouth 148. The chips which are cut from the fabrics by the cutting elements B, C, are successively pushed upwardly by the knife C and are subsequently directed by the deflector wall 147 towards the right as viewed in Fig. 14 and over said knife, from whence they gravitate through the heel of the opening 59 to a point below the base 5. Thus, the deflector J not only functions to prevent the chips from fouling the needle, but also functions to avoid the chips from being deposited on the pinked fabric. The base 145 is mounted on the ledger blade B by means of a depending pin 149 which is seated in an opening 150 formed in one of the arms 57 of the holder E and by a clamping screw 151 which threadably engages in an opening 152 formed in the other arm 57. The base plate 145 is therefore superposed on the ledger blade B and is firmly held thereagainst by said clamping screw to form a solid backing for said blade and thereby retain said blade against being moved by the thrust of the knife C. The front portion of the base overlies the filler plate 140 and attached to said base portion by a screw 153 is an arm 154 having at its left end a depending edge guide 155 for the fabrics and a horizontal fabric guide 156 which projects in front of the presser foot 19, said guides 155, 156 being employed, if desired, when forming the seams shown in Figs. 33 and 34.

In Fig. 35, I have shown the two superposed fabrics 137, 138 united by the line of stitches 136, but the lower fabric 138 only has been pinked. This operation is produced by directing the edge portion of the lower fabric below the ledger blade B and by directing the edge portion of the upper fabric above said ledger blade, whereby the cooperating blades B, C, will pink the lower fabric only. In performing this operation, I preferably employ the filler plate 140, and also a separating plate 157 shown in Figs. 18, 19, 20. This separating plate 157 is mounted on the arms 57, 57 of the holder E by means of a depending pin 158 which is seated in the opening 150 of one of said arms and by the clamping screw 151 which threadably engages in the opening 152 of the other arm. The plate 157 is therefore superposed on the ledger blade B and is firmly held thereagainst by said clamping screw. Thus the separating plate 157 not only serves to maintain the edge portion of the upper fabric separated from the movable knife C, but also serves as a solid backing for the ledger blade B for maintaining the latter against being moved by the thrust of the knife C. This plate is provided with an opening 158a which is slightly larger than the opening of the ledger blade, the opening 158a permitting the pinking chips passing upwardly therethrough.

In Fig. 36, I have shown a seam wherein the edge portions of the fabrics 137, 138 are overlapped, the fabrics being turned under in opposite directions to form hem folds 159, 160, the hem fold 160 being pinked as at 139, and wherein the line of stitches joins the fabrics and the hem folds. In order to form this seam, I have provided upper and lower hemmers 161, 162 as shown in Fig. 19 and have attached said hemmers to the separating plate 157 by a screw 163.

In Fig. 37, I have shown another seam wherein the edge portions of the fabrics 137, 138 are overlapped, the upper fabric being turned under to form a hem fold 164, the lower fabric being pinked as at 139, and wherein the line of stitches 136 joins the fabrics and the hem fold. In order to form this seam, I have provided a hemmer 165 as shown in Figs. 16, 17 and 18 and have attached said hemmer to the separating plate 157 by said screw 163.

In Fig. 38, I have illustrated another seam wherein the edge portions of the fabrics 137, 138 are overlapped, the upper fabric being turned under to form a hem fold 166 and the lower fabric being turned over to form a hem fold 167, the hem fold 166 being pinked as at 139, and wherein the line of stitches 136 joins the fabrics and the hem folds. This seam is formed by superposed hemmers (not shown) mounted on the separating plate 157. The combined seaming and pinking operations shown in Figs. 35, 36, 37 and 38, are referred to in the trade as "top stitching" operations, and I believe that I am the first to provide a combined seaming and pinking machine in which a stationary ledger blade is disposed above the base and a reciprocatory knife cooperates therewith for pinking one or more of the edges of the superposed or lapped layers being seamed.

It is of course to be understood that the details of structure and arrangement of parts may be variously changed and modified without departing from the spirit and scope of my invention.

I claim:

1. The combination of a sewing machine including a frame having a base, a main shaft, and a vertically reciprocatory needle operated by said shaft; and a trimming mechanism comprising a ledger blade spaced above the base, a lever pivoted below the base for oscillations about a horizontal axis, a knife mounted on said lever for cooperation with the ledger blade, means for maintaining the blade and knife in yieldable engagement with each other during cutting movements of the knife, and operating connections between the lever and the main shaft for reciprocating the knife in timed relation to the needle reciprocations.

2. The combination of a sewing machine including a frame having a base, a main shaft, and a vertically reciprocatory needle operated by said shaft; and a trimming mechanism comprising a stationary ledger blade spaced above the base, a lever pivoted below the base for oscillations about a horizontal axis, a knife pivotally mounted on said lever for cooperation with the ledger blade, means cooperating with the knife and lever for maintaining the knife in yieldable engagement with the ledger blade during cutting movements of the knife, and operating connections between the lever and the main shaft for reciprocating the knife in timed relation to the needle reciprocations.

3. The combination of a sewing machine including a frame having a base, a main shaft, and a vertically reciprocatory needle operated by said shaft; and a trimming mechanism comprising a stationary ledger blade spaced above the base, a lever pivoted below the base for oscillations about a horizontal axis, a knife mounted on said lever for cooperation with the ledger blade, and operating connections between the lever and the main shaft for reciprocating the knife in timed relation to the needle reciprocations, including a rocking lever and link pivotally connected to said lever.

4. A combined seaming and trimming mechanism including a vertically reciprocatory needle and a base having an opening at one side of the needle, a support mounted below the base to oscillate about a horizontal axis, a ledger blade spaced above the opening and mounted on the support, manually operable means for normally retaining the support against swinging movement, a knife lever mounted on the support below the base to swing about a horizontal axis, a knife mounted on said lever and projecting upwardly through said opening for cooperation with said ledger blade, said ledger blade and said knife lever being mounted on the support for lateral adjustments towards and from the needle, and means for oscillating said knife lever, said support upon release of said retaining means moving to a position wherein said ledger blade and said knife will be in an ineffective cutting position below the base.

5. A combined seaming and trimming mechanism including a vertically reciprocatory needle and a base having an opening at one side of the needle, a support mounted below the base to oscillate about a horizontal axis, a holder mounted on said support and having an end projecting upwardly through said opening, a ledger blade spaced above the opening and mounted on the projecting end of the support, manually operable means for normally retaining the support and holder against swinging movement, a knife lever located below the holder and fulcrumed thereon to swing about a horizontal axis, a knife mounted on said lever and projecting upwardly through said opening for cooperation with said ledger blade, said ledger blade and said knife lever being mounted on the support for lateral adjustments toward and from the needle, and means for oscillating said knife lever including rocking lever and link connections interposed between the holder and the lever, said support upon release of said retaining means moving to a position wherein said ledger blade and said knife will be in an ineffective cutting position below the base.

6. The combination of a sewing machine including a base, a stitch forming mechanism comprising a vertically reciprocatory needle, a vertical shaft journaled below the base at one side of the needle, a rotary loop taker mounted on the upper end of said shaft for cooperation with the needle, a horizontal driving shaft for the vertical shaft journaled below the base and disposed under the needle, and a trimming mechanism located on the other side of the needle, said trimming mechanism including upper and lower cooperating cutting elements, and supporting means for the elements mounted below the base and above the driving shaft.

7. The combination of a sewing machine including a base, a stitch forming mechanism comprising a vertically reciprocatory needle, a vertical shaft journaled below the base at one side of the needle, a rotary loop taker mounted on the upper end of said shaft for cooperation with the needle, a horizontal driving shaft for the vertical shaft journaled below the base and disposed under the needle, and a trimming mechanism located on the other side of the needle, said trimming mechanism including upper and lower cooperating cutting elements, and supporting means for the elements mounted below the base and above the driving shaft, said elements being adjustable as a unit relative to their supporting means towards and from the needle.

8. The combination of a sewing machine including a base and a vertically reciprocatory needle, and a trimming mechanism comprising upper and lower cooperating cutting elements, the upper element being normally disposed above the base and the lower element being supported below the base, and means for effecting a depression of the cutting elements to an ineffective cutting position with respect to the base.

9. The combination of a sewing machine including a base and a vertically reciprocatory needle, and a trimming mechanism comprising upper and lower cooperating cutting elements, the upper element being normally disposed above the base and the lower element being supported below the base, said elements being bodily adjustable as a unit towards and from the needle, and means for effecting a depression of said cutting elements as a unit to an ineffective cutting position below the base.

10. A combined seaming and trimming mechanism including a vertically reciprocatory needle and a base having an opening at one side of the needle, a support mounted below the base to oscillate about a horizontal axis, a ledger blade spaced above the opening and mounted on the support, means for retaining the support against swinging movement, a knife lever mounted on the support below the base to swing about a horizontal axis, a knife mounted on said lever and projecting upwardly through said opening for cooperation with said ledger blade, said ledger blade and said knife lever being mounted on the support for lateral adjustments towards and from the needle, and means for oscillating said knife lever.

11. A combined seaming and trimming mechanism including a vertically reciprocatory needle and a base having an opening at one side of the needle, a support mounted below the base to oscillate about a horizontal axis, a holder mounted on said support and having an end projecting upwardly through said opening, a ledger blade spaced above the opening and mounted on the projecting end of the support, means for retaining the support and holder against swinging movement, a knife lever located below the holder and fulcrumed thereon to swing about a horizontal axis, a knife mounted on said lever and projecting upwardly through said opening for cooperation with said ledger blade, said ledger blade and said knife lever being mounted on the support for lateral adjustments towards and from the needle, and means for oscillating said knife lever including rocking lever and link connections interposed between the holder and the lever.

12. The combination of a sewing machine including a frame comprising a base, a standard, a laterally extending arm, a horizontal main shaft journaled in the arm, a vertically reciprocatory needle mounted on the arm and operatively connected to the main shaft, a loop taker mounted below the base on one side of the needle for cooperation with the latter, and means for driving the loop taker from the main shaft including a horizontal shaft supported below the base, and driving connections between said shafts located within the standard; and a pinking mechanism located on the other side of the needle and comprising upper and lower cooperating cutting elements, the upper element being spaced above the base, and means located below the base and operated by one of the horizontal shafts for actuating the lower cutting element in timed relation to the needle reciprocations.

13. The combination of a sewing machine including a frame comprising a base, a standard, a laterally extending arm, a horizontal main shaft journaled in the arm, a vertically reciprocatory needle mounted on the arm and operatively connected to the main shaft, a loop taker mounted below the base on one side of the needle for cooperation with the latter, and means for driving the loop taker from the main shaft including a horizontal shaft supported below the base, and driving connections between said shafts located within the standard; and a pinking mechanism located on the other side of the needle and comprising an upper cutting element and a cooperating reciprocatory lower cutting element, the upper element being spaced above the base, and means located below the base and operated by one of the horizontal shafts for reciprocating the lower cutting element in timed relation to the needle reciprocations.

14. The combination of a sewing machine including a base and a vertically reciprocatory needle, and a pinking mechanism comprising a ledger blade spaced above the base and provided with an opening forming converging cutting edges, and a vertically reciprocatory knife supported below the base and having converging cutting edges for cooperation with the cutting edges of the ledger blade, said ledger blade and said knife being bodily adjustable as a unit towards and from the needle.

15. The combination of a sewing machine including a base and a vertically reciprocatory needle, and a pinking mechanism comprising a ledger blade spaced above the base and provided with an opening forming converging cutting edges, and a vertically reciprocatory knife supported below the base and having converging cutting edges for cooperation with the cutting edges of the ledger blade, said ledger blade and said knife being bodily adjustable as a unit towards and from the needle, and means for effecting the depression of the ledger blade and the knife to an ineffective cutting position below the base.

16. The combination of a sewing machine including a frame comprising a base, a standard, a laterally extending arm, a horizontal main shaft journaled in the arm, a vertically reciprocatory needle mounted on the arm and operatively connected to the main shaft, a loop taker mounted below the base on one side of the needle for cooperation with the latter, and means for driving the loop taker from the main shaft including a horizontal countershaft supported below the base, and driving connections between said shafts located within the standard; and a pinking mechanism located on the other side of the needle and comprising a ledger blade spaced above the base provided with an opening forming converging cutting edges, a vertically reciprocatory knife supported below the base and having converging cutting edges for cooperation with the cutting edges of the ledger blade, and means located below the base and operated by one of the horizontal shafts for actuating the lower cutting element in timed relation to the needle reciprocations.

17. A combined seaming and pinking mechanism including a base and a reciprocatory needle, a ledger blade provided with an opening forming converging cutting edges, a vertically reciprocatory knife provided with converging cutting edges on its upper end for cooperation with the cutting edges of the ledger blade, means located below the base for supporting the blade and knife, and means for reciprocating the knife in timed relation to the needle reciprocations.

18. A combined seaming and pinking mechanism including a base and a reciprocatory needle, a ledger blade provided with an opening forming converging cutting edges, a vertically reciprocatory knife provided with converging cutting edges on its upper end for cooperation with the cutting edges of the ledger blade, vertically movable means located below the base for supporting the blade and knife, means for reciprocating the knife in timed relation to the needle reciprocations, and manually operable means cooperating with said supporting means for raising said blade and knife from an ineffective cutting position below the base to an effective cutting position wherein the ledger blade is disposed above the base, or for effecting a depression of said blade and knife to said ineffective cutting position.

19. A combined seaming and pinking mechanism including a base and a reciprocatory needle, a ledger blade provided with an opening forming converging cutting edges, a vertically reciprocatory knife provided with converging cutting edges on its upper end for cooperation with the cutting edges of the ledger blade, vertically movable means located below the base for supporting the blade and knife, means for reciprocating the knife in timed relation to the needle reciprocations, and manually operable means cooperating with said supporting means for raising said blade and knife as a unit from an ineffective cutting position below the base to an effective cutting position wherein the ledger blade is disposed above the base, or for effecting a depression of said blade and knife to said ineffective cutting position.

20. A combined seaming and pinking machine, including a main shaft and a reciprocatory needle, a pinking device disposed in cooperative relation to the needle, means for operating said pinking device in timed relation to the needle reciprocations including a counter shaft operatively connected with said pinking device, a reduction gear coupling between said shafts including a gear loosely mounted on one of said shafts, a clutch interposed between said loosely mounted gear and its shaft for rendering the pinking device either operative or inoperative, and a manually operable element rotatably mounted on said last mentioned shaft for cooperation with said clutch to effect a clutching or unclutching of said loosely mounted gear and its shaft.

21. A combined seaming and pinking machine, including a main shaft and a reciprocatory needle, a pinking device disposed in cooperative relation to the needle, and means for operating said pinking device in timed relation to the needle reciprocations comprising selective means for varying the relation of the number of needle reciprocations to each pink formed in the fabric including a counter shaft operatively connected with said pinking device, separate reduction gear couplings of different ratios connected to one of said shafts, separate clutches disposed between the respective couplings and the last mentioned shaft, and an operating element rotatably mounted on the last mentioned shaft for rendering either clutch effective.

22. A combined seaming and pinking machine, including a main shaft and a reciprocatory needle, a pinking device disposed in cooperative relation to the needle, and means for operating said pinking device in timed relation to the needle reciprocations comprising selective means for varying the relation of the number of needle reciprocations to each pink formed in the fabric including a counter shaft operatively connected with said pinking device, separate reduction gear couplings of different ratios connected to one of said shafts, said couplings comprising driving gears and driven gears, one of the driven gears having a hub supporting the other driven gear, a clutch collar fixed to the shaft on which the driven gears are journaled, clutch pins adapted to clutch either driven gear and the clutch collar, and an operating element rotatably mounted on the clutch collar shaft for cooperation with the clutch pins for effecting a clutching action between either driven gear and the clutch collar.

23. In a combined seaming and pinking machine, the combination with a main frame including a base and an overhanging arm, of a vertically reciprocatory needle mounted on said arm, a main shaft journaled in said arm and extending longitudinally thereof and operatively connected to said needle, a pinking device supported by the base in cooperative relation to the needle, a bracket attached to said frame arm, a counter shaft journaled in said bracket, operative connections between the pinking device and the counter shaft, a reduction gear coupling between the main shaft and the counter shaft and including a gear loosely mounted on the counter shaft, and a manually operable clutch interposed between said loosely mounted gear and the counter shaft for rendering the pinking device either operative or inoperative.

24. In a combined seaming and pinking machine, the combination with a main frame including a base and an overhanging arm, of a vertically reciprocatory needle mounted on said arm, a main shaft journaled in said arm and extending longitudinally thereof and operatively connected to said needle, a pinking device supported by the base in cooperative relation to the needle, said pinking device including a ledger blade having a V-shaped opening forming converging cutting edges, and a cooperating vertically reciprocatory knife having converging cutting edges, a bracket attached to said frame arm, a counter shaft journaled in said bracket, operative connections between the reciprocatory knife and the counter shaft, a reduction gear coupling between the main shaft and the counter shaft and including a gear loosely mounted on the counter shaft, and a manually operable clutch interposed between said loosely mounted gear and the counter shaft for rendering the reciprocatory knife either operative or inoperative.

25. A combined seaming and pinking machine, including a main shaft and a reciprocatory needle, a pinking device disposed in cooperative relation to the needle, and means for operating said pinking device in timed relation to the needle reciprocations comprising selective means for varying the relation of the number of needle reciprocations to each pink formed in the fabric including a counter shaft operatively connected with said pinking device, separate reduction gear couplings of different ratios connected to one of said shafts, said couplings comprising driving gears and driven gears, one of the driven gears having a hub supporting the other driven gear, a clutch collar fixed to the shaft on which the driven gears are journaled, clutch pins adapted to clutch either driven gear and the clutch collar, and an operating element rotatably mounted on the clutch collar shaft for cooperation with the clutch pins for effecting a clutching action between either driven gear and the clutch collar, or for effecting the unclutching of both driven gears and the collar.

26. A combined seaming and trimming machine having a base and a reciprocatory needle, upper and lower cooperating cutting elements normally disposed in ineffective cutting position below the base, manually operable means for raising said cutting elements to effective cutting position in cooperative relation to the needle and wherein the upper cutting element is disposed above the base, or for effecting the depression of said cutting elements to their normal position below the base, and means for operating said trimming device in timed relation to the needle reciprocations including manually operative selective means for varying the relation of the number of needle reciprocations to the number of cuts formed by the cutting elements.

27. A combined seaming and trimming machine having a base and a reciprocatory needle, upper and lower cooperating cutting elements normally disposed in ineffective cutting position below the base, manually operable means for raising said cutting elements to effective cutting position in cooperative relation to the needle and wherein the upper cutting element is disposed above the base, or for effecting the depression of said cutting elements to their normal position below the base, and means for operating said trimming device in timed relation to the needle reciprocations including manually operative selective means for varying the relation of the number of needle reciprocations to the number of cuts formed by the cutting elements including a counter shaft operatively connected with said trimming device, separate reduction gear couplings of different ratios connected to one of said shafts, said couplings comprising driving gears and driven gears, one of the driven gears having a hub supporting the other driven gear, a clutch collar fixed to the shaft on which the driven gears are journaled, clutch pins adapted to clutch either driven gear and the clutch collar, and an operating element rotatably mounted on the clutch collar shaft for cooperation with the clutch pins for effecting a clutching action between either driven gear and the clutch collar.

28. In a combined seaming and pinking machine, the combination with a main frame including a base and an overhanging arm, of a vertically reciprocatory needle mounted on said arm, a main shaft journaled in said arm and extending longitudinally thereof and operatively connected to said needle, a pinking device supported by the base in cooperative relation to the needle, said pinking device including cooperative cutting elements, one of said elements being located above the base and the other being supported below the base, and driving connections including a reduction gear coupling between one of said elements and said main shaft.

29. In a combined seaming and pinking machine, the combination of a base having an opening, a vertically reciprocatory needle, a pinking mechanism located in cooperative relation to the needle and including a ledger blade spaced above the opening of the base and provided with an opening forming converging cutting edges, and a vertically reciprocatory knife supported below the base and provided with converging cutting edges on its upper end for cooperation with the cutting edges of the ledger blade during the upstroke of the knife, and means located between the needle and the ledger blade for guarding the needle against the fabric chips cut off by the pinking mechanism.

30. In a combined seaming and pinking machine, the combination of a base having an opening, a vertically reciprocatory needle, a pinking mechanism located in cooperative relation to the needle and including a ledger blade spaced above the opening of the base and provided with an opening forming converging cutting edges, and a vertically reciprocatory knife supported below the base and provided with converging cutting edges on its upper end for cooperation with the cutting edges of the ledger blade during the upstroke of the knife, and means located between the needle and the ledger blade for guarding the needle against the fabric chips cut off by the pinking mechanism and for directing said chips over the knife and thence downwardly through the base opening.

31. In a combined seaming and pinking machine, the combination of a base having an opening, a vertically reciprocatory needle, a pinking mechanism located in cooperative relation to the needle and including a ledger blade spaced above the opening of the base and provided with an opening forming converging cutting edges, and a vertically reciprocatory knife supported below the base and provided with converging cutting edges on its upper end for cooperation with the cutting edges of the ledger blade during the upstroke of the knife, and an inverted semi-conical shell positioned over the ledger blade and knife for guarding the needle against the fabric chips cut off by the pinking mechanism and for directing said chips over the knife and thence downwardly through the base opening.

32. A combined seaming and trimming mechanism including a vertically reciprocatory needle and a base having an opening at one side of the needle, a support mounted below the base to oscillate about a horizontal axis, a ledger blade spaced above the opening and mounted on the support, manually operable means for normally retaining the support against swinging movement, a knife lever mounted on the support below the base to swing about a horizontal axis, a knife mounted on said lever and projecting upwardly through said opening for cooperation with said ledger blade, and means for oscillating said knife lever, said support upon release of said retaining means moving to a position wherein said ledger blade and said knife will be in an ineffective cutting position below the base.

33. A combined seaming and trimming mechanism including a vertically reciprocatory needle and a base having an opening at one side of the needle, a support mounted below the base to oscillate about a horizontal axis, a holder mounted on said support and having an end projecting upwardly through said opening, a ledger blade spaced above the opening and mounted on the projecting end of the support, manually operable means for normally retaining the support and holder against swinging movement, a knife lever located below the holder and fulcrumed thereon to swing about a horizontal axis, a knife mounted on said lever and projecting upwardly through said opening for cooperation with said ledger blade, and means for oscillating said knife lever including rocking lever and link connections interposed between the holder and the lever, said support upon release of said retaining means moving to a position wherein said ledger blade and said knife will be in an ineffective cutting position below the base.

34. The combination of a sewing machine including a base and a vertically reciprocatory needle, and a pinking mechanism comprising a ledger blade spaced above the base and provided with an opening forming converging cutting edges, and a vertically reciprocatory knife supported below the base and having converging cutting edges for cooperation with the cutting edges of the ledger blade, and means for effecting the depression of the ledger blade and the knife to an ineffective cutting position below the base.

35. The combination of a sewing machine including a base, a main shaft, and a vertically reciprocatory needle operatively connected with said shaft, and a pinking mechanism comprising a horizontally disposed ledger blade located adjacent the needle and spaced above the base, said ledger blade being provided with a V-shaped opening, a vertically reciprocatory knife supported below the base and provided with converging cutting edges on its upper end for cooperation with the cutting edges of the ledger blade, and driving connections between the main shaft and the knife for reciprocating the latter in timed relation to the needle reciprocations.

36. The combination of a sewing machine including a base, a main shaft, and a vertically reciprocatory needle operatively connected with said shaft, and a pinking mechanism comprising a horizontally disposed ledger blade located adjacent the needle and spaced above the base, said ledger blade being provided with a V-shaped opening, a vertically reciprocatory knife supported below the base and provided with converging cutting edges on its upper end for cooperation with the cutting edges of the ledger blade, the angle of the cutting edges of the ledger blade being more than the angle of the cutting edges of the knife, means for maintaining the cutting edges of the blade and knife in yieldable engagement with each other during cutting movements of the knife, and driving connections including a reduction gear coupling between the main shaft and the knife for reciprocating the latter in timed relation to the needle reciprocations.

37. The combination of a sewing machine including a base, a standard, an arm extending laterally over the base from the upper end of the standard, a main shaft journaled in said arm, a vertically reciprocatory needle mounted on the free end of the arm and having a one-to-one driving connection with the main shaft; and a pinking mechanism comprising a horizontally disposed ledger blade located adjacent the needle and normally spaced above the base, said ledger blade being provided with a V-shaped opening, a vertically reciprocatory knife supported below and projecting upwardly through the base and provided with converging cutting edges on its upper end for cooperation with the cutting edges of the ledger blade, means for effecting the depression of the blade and knife to an ineffective cutting position below the base, and driving connections between the main shaft and the knife for reciprocating the latter in timed relation to the needle reciprocations, said driving connections including a reduction gear coupling mounted on the frame arm, and connections between said coupling and the knife located adjacent the standard.

38. The combination of a sewing machine including a base, a standard, an arm extending laterally over the base from the upper end of the standard, a main shaft journaled in said arm, a vertically reciprocatory needle mounted on the free end of the arm and having a one-to-one driving connection with the main shaft; and a pinking mechanism comprising a horizontally disposed ledger blade located adjacent the needle and normally spaced above the base, said ledger blade being supported below the base and provided with a V-shaped opening, a vertically reciprocatory knife supported below and projecting upwardly through the base and provided with converging cutting edges on its upper end for cooperation with the cutting edges of the ledger blade, means for effecting the depression of the blade and knife to an ineffective cutting position below the base, driving connections between the main shaft and the knife for reciprocating the latter in timed relation to the needle reciprocations, said driving connections including a reduction gear coupling mounted on the frame arm, and connections between said coupling and the knife located adjacent the standard.

39. In a combined seaming and pinking machine, the combination with a main frame having a base and an overhanging arm, of a main shaft journaled in said arm, a vertically reciprocatory needle mounted on the arm, said base having an opening at one side of the needle, and a pinking device including a horizontal ledger blade supported above the opening in the base and provided with a V-shaped opening, a vertically reciprocatory V-shaped knife supported below the base and projecting upwardly through the opening of the base for cooperation with the ledger blade opening, and driving connections between the main shaft and the knife for reciprocating the latter in timed relation to the needle reciprocations.

40. In a combined seaming and pinking machine, the combination with a main frame having a base and an overhanging arm, of a main shaft journaled in said arm, a vertically reciprocatory needle mounted on the arm, said base having an opening at one side of the needle, and a pinking device including a horizontal ledger blade supported above the opening in the base and provided with a V-shaped opening, a vertically reciprocatory V-shaped knife supported below the base and projecting upwardly through the opening of the base for cooperation with the ledger blade opening, and driving connections between the main shaft and the knife for reciprocating the latter in timed relation to the needle reciprocations, said driving connections including manually operative selective means for varying the relation of the number of needle reciprocations to the number of knife reciprocations.

41. In a combined seaming and pinking machine, the combination with a main frame having a base and an overhanging arm, of a main shaft journaled in said arm, a vertically reciprocatory needle mounted on the arm, said base having an opening at one side of the needle, and a pinking device including a horizontal ledger blade supported above the opening in the base and provided with a V-shaped opening, a vertically reciprocatory V-shaped knife supported below the base and projecting upwardly through the opening of the base for cooperation with the ledger blade opening, driving connections between the main shaft and the knife for reciprocating the latter in timed relation to the needle reciprocations, and means for effecting the depression of the ledger blade and knife to an ineffective cutting position.

42. In a combined seaming and pinking machine, the combination with a main frame having a base and an overhanging arm, of a main shaft journaled in said arm, a vertically reciprocatory needle mounted on the arm, said base having an opening at one side of the needle, and a pinking device including a horizontal ledger blade supported above the opening in the base and provided with a V-shaped opening, a vertically reciprocatory V-shaped knife supported below the base and projecting upwardly through the opening of the base for cooperation with the ledger blade opening, driving connections between the main shaft and the knife for reciprocating the latter in timed relation to the needle reciprocations, manually operable means including a cam for normally retaining said blade and knife in effective cutting position, and spring means for effecting a depression of said blade and knife to an ineffective cutting position upon release of said retaining means.

43. In a combined seaming and pinking machine, the combination of a base and a vertically reciprocatory needle, the base having an opening at one side of the needle, a ledger blade supported above the opening in the base and provided with a V-shaped opening forming converging cutting edges, a vertically reciprocatory V-shaped knife supported below the base and projecting upwardly through the opening of the base for cooperation with the cutting edges of the ledger blade, and means for reciprocating the knife in timed relation to the needle reciprocations.

44. In a combined seaming and pinking machine, the combination of a base and a vertically reciprocatory needle, the base having an opening at one side of the needle, a ledger blade supported above the opening in the base and provided with a V-shaped opening forming converging cutting edges, a vertically reciprocatory V-shaped knife supported below the base and projecting upwardly through the opening of the base for cooperation with the cutting edges of the ledger blade, and means for reciprocating the knife in timed relation to the needle reciprocations including manually controlled means for silencing said knife.

45. In a combined seaming and pinking machine, the combination of a base and a vertically reciprocatory needle, the base having an opening at one side of the needle, a ledger blade supported above the opening in the base and provided with a V-shaped opening forming converging cutting edges, a vertically reciprocatory V-shaped knife supported below the base and projecting upwardly through the opening of the base for cooperation with the cutting edges of the ledger blade, and means for reciprocating the knife in timed relation to the needle reciprocations including manually controlled means for varying the relation of the number of needle reciprocations to the knife reciprocations or for silencing said knife.

46. In a combined seaming and pinking machine, the combination of a base and a vertically reciprocatory needle, the base having an opening at one side of the needle, a ledger blade supported above the opening in the base and provided with a V-shaped opening forming converging cutting edges, a vertically reciprocatory V-shaped knife supported below the base and projecting upwardly through the opening of the base for cooperation with the cutting edges of the ledger blade, means for reciprocating the knife in timed relation to the needle reciprocations, and a separating plate positioned above the ledger blade.

47. In a combined seaming and pinking machine, the combination of a base and a vertically reciprocatory needle, the base having an opening at one side of the needle, a ledger blade supported above the opening in the base and provided with a V-shaped opening forming converging cutting edges, a vertically reciprocatory V-shaped knife supported below the base and projecting upwardly through the opening of the base for cooperation with the cutting edges of the ledger blade, means for reciprocating the knife in timed relation to the needle reciprocations, and a separating plate positioned above the ledger blade and provided with an opening for receiving the upper end of the knife.

48. In a combined seaming and pinking machine, the combination of a base and a vertically reciprocatory needle, the base having an opening at one side of the needle, a ledger blade supported above the opening in the base and provided with a V-shaped opening forming converging cutting edges, a vertically reciprocatory V-shaped knife supported below the base and projecting upwardly through the opening of the base for cooperation with the cutting edges of the ledger blade, means for reciprocating the knife in timed relation to the needle reciprocations, a separating plate positioned above the ledger blade, and a folder mounted on said plate and disposed in front of the ledger blade for directing a folded fabric edge or edge portions to said blade and knife.

49. A combined seaming and trimming mechanism including a vertically reciprocatory needle and a base having an opening at one side of the needle, a support mounted below the base to oscillate about a horizontal axis, a ledger blade spaced above the opening and mounted on the support, means for retaining the support against swinging movement, a knife lever mounted on the support below the base to swing about a horizontal axis, a knife mounted on said lever and projecting upwardly through said opening for cooperation with said ledger blade, and means for oscillating said knife lever.

50. A combined seaming and trimming mechanism including a vertically reciprocatory needle and a base having an opening at one side of the needle, a support mounted below the base to oscillate about a horizontal axis, a holder mounted on said support and having an end projecting upwardly through said opening, a ledger blade spaced above the opening and mounted on the projecting end of the support, means for retaining the support and holder against swinging movement, a knife lever located below the holder and fulcrumed thereon to swing about a horizontal axis, a knife mounted on said lever and projecting upwardly through said opening for cooperation with said ledger blade, and means for oscillating said knife lever including rocking lever and link connections interposed between the holder and the lever.

51. A combined seaming and pinking mechanism including a base and a reciprocatory needle, comprising a ledger blade provided with an opening forming converging cutting edges, a vertically reciprocatory knife provided with converging cutting edges on its upper end for cooperation with the cutting edges of the ledger blade, means located below the base for supporting the blade and knife, means for reciprocating the knife in timed relation to the needle reciprocations, and means for effecting the depression of the ledger blade and knife to an ineffective cutting position.

52. A combined seaming and pinking mechanism including a base and a reciprocatory needle, comprising a stationary ledger blade spaced above the base and provided with an opening forming converging cutting edges, a reciprocatory knife provided with converging cutting edges for cooperation with the cutting edges of the ledger blade, and means for reciprocating the knife in timed relation to the needle reciprocations.

53. A combined seaming and pinking mechanism including a frame including a base and a reciprocatory needle, comprising a stationary ledger blade spaced above the base and provided with an opening forming converging cutting edges, means mounted on the machine frame for supporting the ledger blade in said spaced relation to the base, a reciprocatory knife provided with converging cutting edges for cooperation with the cutting edges of the ledger blade, a backing plate for the ledger blade mounted on said supporting means to resist the thrust of the knife against the ledger blade, and means for reciprocating the knife in timed relation to the needle reciprocations.

54. A stitching and pinking mechanism comprising in combination a sewing machine including a frame having a base, a main shaft rotatably mounted in the frame and stitch-forming mechanism driven by the main shaft; and pinking mechanism driven by the main shaft including a pair of cooperating, relatively movable, pinking knives having coacting cutting edges disposed to effect cutting in a plane substantially parallel to the plane of the base of the frame, operating mechanism mounted below the base of the frame for effecting relative movement of the knives transverse to the cutting plane of the knives, and means operatively connecting said knife operating mechanism to be driven by the main shaft of the sewing machine.

55. A stitching and pinking mechanism comprising in combination a sewing machine including a frame having a base, a main shaft rotatably mounted in the frame and stitch-forming mechanism driven by the main shaft; and pinking mechanism driven by the main shaft including a stationary knife and a movable knife, the cutting edges of the knives cooperating in a plane substantially parallel to the plane of the base of the frame, operating mechanism mounted below the base of the machine for effecting movement of the movable knife transverse to the cutting plane of the knives, and means operatively connecting said knife operating mechanism to be driven by the main shaft of the sewing machine.

56. A stitching and pinking mechanism comprising in combination a sewing machine including a frame having a base, a main shaft rotatably mounted in the frame and stitch-forming mechanism driven by the main shaft; and pinking mechanism driven by the main shaft including a pair of cooperating, relatively movable, pinking knives having coacting cutting edges, one of said knives being disposed with the cutting edge thereof substantially parallel to the base of the frame, operating mechanism mounted below the base of the frame for effecting relative movement of the knives transverse to the cutting edges thereof, and means operatively connecting said knife operating mechanism to be driven by the main shaft of the sewing machine.

57. A stitching and pinking mechanism comprising in combination a sewing machine including a frame having a base, a main shaft rotatably mounted in the frame and stitch-forming mechanism driven by the main shaft; and pinking mechanism driven by the main shaft including a stationary knife and a movable knife, the stationary knife being disposed with the cutting edge thereof substantially parallel to the plane of the base of the frame, operating mechanism mounted below the base of the machine for effecting movement of the movable knife transverse to the cutting edge thereof, and means operatively connecting said knife operating mechanism to be driven by the main shaft of the sewing machine.

58. A stitching and pinking mechanism comprising in combination a sewing machine including a frame having a base, a main shaft rotatably mounted in the frame and stitch-forming mechanism driven by the main shaft; and pinking mechanism driven by the main shaft including a stationary ledger blade having an opening therethrough forming converging cutting edges, the ledger blade being disposed substantially parallel to the plane of the base of the frame, a movable knife having converging cutting edges for coacting with the cutting edges of the ledger blade, operating mechanism mounted below the base for effecting movement of the movable knife into and out of the opening in the ledger blade, and means operatively connecting said knife operating mechanism to be driven by the main shaft of the sewing machine.

59. A stitching and pinking mechanism comprising in combination a sewing machine including a frame having a base, a main shaft rotatably mounted in the frame, and stitch-forming mechanism driven by the main shaft, pinking mechanism driven by the main shaft including a pair of cooperating, relatively movable, pinking knives having coacting cutting edges disposed to effect cutting in a plane substantially parallel to the plane of the base of the frame, operating mechanism mounted below the base of the frame for effecting relative movement of the knives transverse to the cutting plane of the knives and means operatively connecting said knife operating mechanism to be driven by the main shaft of the sewing machine, and means for effecting a depression of said pinking mechanism to an ineffective position below the base.

60. A stitching and trimming mechanism comprising in combination a sewing machine including a frame having a base, stitch-forming mechanism mounted on the frame and trimming mechanism mounted below the base of the frame and comprising upper and lower cooperating cutting elements, the upper element being disposed above the base and the lower element being supported below the base, and manually operative means for effecting a depression of said cutting elements below the upper surface of the base to an ineffective cutting position.

61. A stitching and trimming mechanism comprising in combination a sewing machine including a frame having a base, stitch forming mechanism mounted on the frame, and trimming mechanism comprising upper and lower cooperating cutting elements, the upper element being disposed above the base and the lower element being supported below the base, and means including a manually operative lever for effecting a depression of said cutting elements as a unit to an ineffective cutting position below the base.

62. In a combined seaming and trimming mechanism, the combination comprising a sewing machine including a frame having a base and stitch-forming mechanism mounted on the frame, and trimming mechanism including a vertically reciprocatory support mounted below the base and having a portion projecting upwardly therethrough, a ledger blade mounted on the projecting portion of the support and spaced above the base, a cooperating, vertically reciprocatory knife mounted below the base, and means for effecting a depression of said ledger blade and knife to an ineffective cutting position below the base.

63. In a combined seaming and trimming mechanism, the combination comprising a frame having a base and stitch-forming mechanism mounted on the frame, and trimming mechanism including upper and lower cooperating cutting elements, the upper element being disposed above the base and the lower element being supported below the base, and manually operable means for normally retaining the cutting elements in effective cutting position and for effecting a depression of said cutting elements to an ineffective cutting position below the base upon release of said retaining means.

64. In a combined seaming and trimming mechanism, the combination comprising a sewing machine including a frame having a base and stitch-forming mechanism mounted on the frame, and trimming mechanism including upper and lower cooperating cutting elements, the upper element being disposed above the base and the lower element being supported below the base, and manually operable means including a cam for normally retaining the cutting elements in effective cutting position and for effecting a depression of said elements to an ineffective cutting position below the base upon release of said retaining means.

65. In a combined seaming and trimming mechanism, the combination comprising a sewing machine including a frame having a base and stitch-forming mechanism mounted on the frame, and trimming mechanism including upper and lower cooperating cutting elements, the upper element being disposed above the base and the lower element being supported below the base, and manually operable means including a cam for normally retaining the cutting elements in effective cutting position, and a spring for depressing said elements to an ineffective cutting position below the base upon release of said retaining means.

66. In a combined seaming and trimming mechanism for sewing machines, the combination comprising a sewing machine including a frame having a base with an opening therethrough and stitch-forming mechanism mounted on the frame, and trimming mechanism including a support mounted below the base to oscillate about a horizontal axis, a ledger blade spaced above the opening through the base of the frame and mounted on the support, manually operable means for normally retaining the support against swinging movement, a lever mounted below the base to swing about a horizontal axis, a knife mounted on said lever and projecting upwardly through said opening for cooperation with said ledger blade, and means for oscillating said knife, said support upon release of said retaining means moving to a position wherein said ledger blade and said knife will be in an ineffective cutting position below the base.

67. In a combined seaming and trimming mechanism, the combination comprising a sewing machine including a frame having a base with an opening therethrough and stitch-forming mechanism mounted on the frame, and trimming mechanism including a support mounted below the base to oscillate about a horizontal axis, a ledger blade spaced above the opening through the base and mounted on the support, means for retaining the support against swinging movement, a knife lever mounted on the support below the base to swing about a horizontal axis, a knife mounted on said lever and projecting upwardly through said opening for cooperation with said ledger blade, and means for oscillating said knife lever.

GEOFFREY STEVENSON.